US012583268B2

(12) United States Patent
Degenhardt et al.

(10) Patent No.: US 12,583,268 B2
(45) Date of Patent: Mar. 24, 2026

(54) SYSTEMS AND METHODS FOR DETERMINING TIRE INFLATION PRESSURE LOSS

(71) Applicant: Ford Global Technologies, LLC, Dearborn, MI (US)

(72) Inventors: James Degenhardt, Plymouth, MI (US); Mohammad Hessam Olya, Detroit, MI (US); Hiva Ghanbari, West Bloomfield, MI (US); Amit Mohanty, Canton, MI (US); Xiangrui Zeng, Northville, MI (US)

( * ) Notice: Subject to any disclaimer, the term of this patent is extended or adjusted under 35 U.S.C. 154(b) by 581 days.

(21) Appl. No.: 17/536,503

(22) Filed: Nov. 29, 2021

(65) Prior Publication Data

US 2022/0176758 A1      Jun. 9, 2022

Related U.S. Application Data

(60) Provisional application No. 63/122,800, filed on Dec. 8, 2020.

(51) Int. Cl.
B60C 23/04      (2006.01)
G06F 17/18      (2006.01)

(52) U.S. Cl.
CPC ...... B60C 23/0479 (2013.01); B60C 23/0477 (2013.01); G06F 17/18 (2013.01)

(58) Field of Classification Search
CPC .. B60C 23/0479; B60C 23/0477; G06F 17/18
See application file for complete search history.

(56) References Cited

U.S. PATENT DOCUMENTS

| | | | | |
|---|---|---|---|---|
| 6,243,007 B1* | 6/2001 | McLaughlin | ....... | B60C 23/0433 340/447 |
| 2002/0024432 A1* | 2/2002 | Lin | ..................... | B60C 23/0401 340/447 |
| 2003/0070478 A1* | 4/2003 | Fischer | ............... | B60C 23/0408 73/146 |
| 2003/0234041 A1* | 12/2003 | Boulot | ............... | B60C 23/0408 73/146 |
| 2006/0010961 A1* | 1/2006 | Gibson | ............... | B60C 23/0408 73/146 |
| 2009/0207009 A1* | 8/2009 | Kiesewetter | ........ | B60C 23/0401 340/442 |
| 2011/0163865 A1* | 7/2011 | Liberge | ............... | B60C 23/0408 340/442 |
| 2015/0032357 A1* | 1/2015 | Dudar | ................... | F02P 5/1502 73/40 |

FOREIGN PATENT DOCUMENTS

| | | | | | |
|---|---|---|---|---|---|
| EP | 2862731 | * | 4/2015 | ............. | B60C 23/04 |
| JP | 2000238516 | * | 9/2000 | ............. | B60C 23/06 |

* cited by examiner

*Primary Examiner* — Catherine T. Rastovski
*Assistant Examiner* — Sharah Zaab
(74) *Attorney, Agent, or Firm* — Frank Lollo; Eversheds Sutherland (US) LLP

(57)                ABSTRACT
This disclosure describes systems and methods for determining tire inflation pressure loss. An example method may include receiving first tire pressure data for a first tire of a vehicle at a first time. The example method may also include receiving second tire pressure data for the first tire at a second time. The example method may also include identifying a slow leak in the first tire based on a relationship between the first tire pressure data and the second tire pressure data. The example method may also include causing to send an alert to a user.

16 Claims, 10 Drawing Sheets

400

700

Nonlinear Drop Low Durbin
Watson Statistic

710

Linear Drop
Durbin Watson Statistic

1100

SYSTEMS AND METHODS FOR DETERMINING TIRE INFLATION PRESSURE LOSS

CROSS-REFERENCE TO RELATED APPLICATIONS

This application claims priority to U.S. Provisional Patent Application No. 63/122,800, filed on Dec. 8, 2020, entitled "Systems and Methods for Determining Tire Inflation Pressure Loss," the entire contents of which are incorporated herein by reference in their entirety for all purposes.

BACKGROUND

The tire pressure monitoring system (TPMS) of the vehicle monitors the pressure of each tire and alerts the driver when the tire pressure value drops below a certain threshold. However, if the tires are compromised (e.g., a nail in the tire, or a damaged valve stem) and the customer inflates the tire, the tire pressure will continue to drop due to the impairment, and the low-pressure warning light will be re-activated again (e.g., in days or weeks).

The warning from the TPMS is based on real-time inflation pressure values of the tire. The historical time sequences of the tire inflation pressure data are not considered. The customer does not know if the tire is defective or the pressure drop is because of normal maintenance. There is no early abnormal leakage warning before hitting the TPMS threshold.

BRIEF DESCRIPTION OF THE DRAWINGS

The detailed description is set forth with reference to the accompanying drawings. The use of the same reference numerals indicates similar or identical components or elements; however, different reference numerals may be used as well to indicate components or elements which may be similar or identical. Various embodiments of the disclosure may utilize elements and/or components other than those illustrated in the drawings, and some elements and/or components may not be present in various embodiments. Depending on the context, singular terminology used to describe an element or a component may encompass a plural number of such elements or components and vice versa.

DETAILED DESCRIPTION

Figure 1:
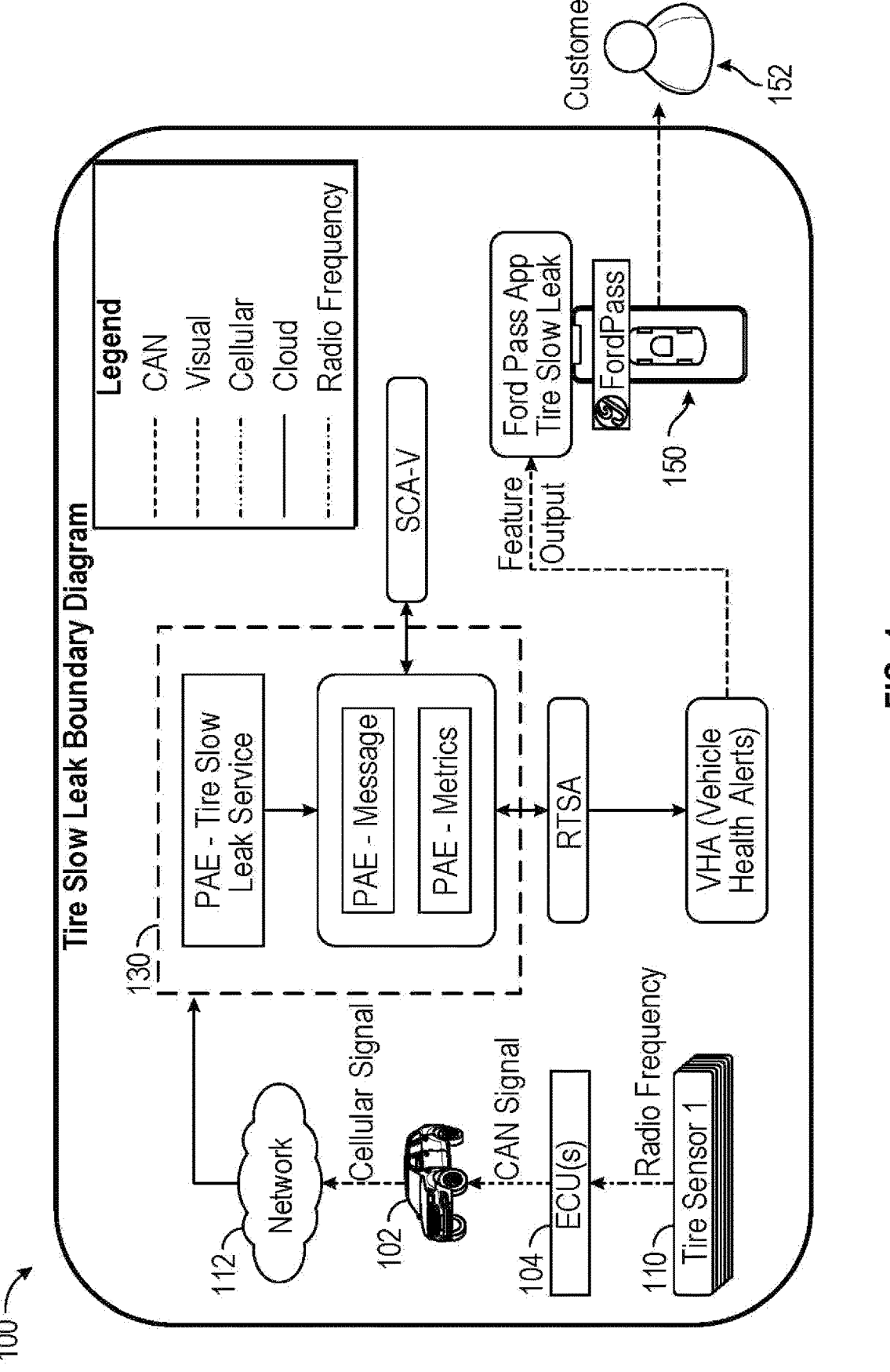
FIG. 1 illustrates an example system, in accordance with one or more embodiments of the disclosure.

The disclosure is directed to systems and methods for a tire inflation pressure loss prognostic system that utilizes the historical time series of the TPMS inflation pressure data to detect abnormal inflation pressure losses before the tire inflation pressure drops below the current TPMS low pressure threshold. This may be accomplished by using tire inflation pressure data sent to the cloud from the onboard vehicle modem (or other wireless connection). That is, to overcome the above-referenced challenges, the proposed systems and methods take advantage of the historical tire pressures to develop the tire pressure prognostic algorithm. The algorithm uses tire inflation pressure for all tires in the vehicle, the date and time of measurement, as well as ambient temperature data to remove the daily temperature fluctuation impact on the tire inflation pressure. The ambient temperature can be extracted from vehicle sensor data or external weather data service using vehicle latitude and longitude at the time of the signal.

The algorithm may be designed to be complementary to TPMS warnings, and in some instances the TPMS warnings may supersede any Tire Leak messages.

The proposed tire prognostics algorithm can be implemented either on the vehicle, in the cloud, or a combination thereof. For example, one or more processor or modules on the vehicle can implements the systems and methods disclosed herein. Likewise, information from the vehicle may be transmitted over to the cloud to one or more service provider servers. The message to the customer can be sent via an in-vehicle display or HMI, or notifications in mobile apps, texts, and/or e-mails.

In one example, with time sequence data, the tire prognostics algorithm may be able to detect abnormal leakage before the inflation pressure value drops below the current TPMS warning light threshold. Therefore, it is possible to send early warnings to the customer to improve the reliability of the tire and vehicle, and avoid inconvenience and downtime caused by flat tires. More so, with time sequence data, the tire prognostics algorithm may be able to tell whether the tire pressure drop rate is normal and whether the tire requires special care and inspection. If the inflation pressure drop rate is significantly higher than the average inflation pressure drop rate, it is likely that the tire has been compromised. Therefore, the system may be able to send an actionable message to the customer, such as "tire requires inflation" or "tire requires inspection and/or repair," that identifies which tire(s) may be compromised.

A slow leak may be identified in any number of different ways. As one example, a slow leak may be identified in a tire by comparing tire pressure data for one tire with tire pressure data for another tire of the vehicle. For example, data may be collected over time for each tire of the vehicle. In some cases, a linear fit may be applied to the data in order to determine a slope associated with the data. This slope may be indicative of a rate of change of the tire pressure over time for that particular tire. If the absolute value of a slope associated with one (or more) particular tire (if the tire is experiencing a leak, the slope will be negative) is above a threshold amount larger than the slopes associated with the other tires of the vehicle, then this may provide an indication that the tire is experiencing a slow leak.

Another example of a manner in which a slow leak may be identified may include comparing tire pressure data for one tire against historical tire pressure data for that same tire and/or other tires of the vehicle. This historical tire pressure data may be stored locally at the vehicle or at a remote database. The comparison may involve comparing data to historical data associated only with that particular vehicle (for example, VIN-specific data), or may apply to all vehicles of the same make/model/year using the same types of tires, for example. In some cases, a combination of comparisons between data associated with different tires of the vehicle and a comparison between current data and historical data may be employed. Additionally, any other types of comparisons or determinations may be performed to identify the slow leak. That is, the examples provided above are not intended to be limiting in any way.

In some cases, tire pressure data for various tires of a vehicle may also be post-processed to account for external factors that may influence the data. Examples of such external factors may include temperature, altitude, road surface conditions, atmospheric pressure, sun-load, vehicle load, and/or any other factors. For example, warmer tires may be associated with a higher tire pressure than cooler tires. These factors may be taken into account using vehicle sensors, third party data, and/or information about the location of the vehicle. For example, temperature information may be received from a third party service. Temperature information may also be captured by temperature sensors included inside and/or outside of the vehicle, and/or inside the internal cavities of the tires of the vehicle. Altitude information may be obtained from an altimeter included with the vehicle, or may be determined based on location information associated with the vehicle, which may be cross-referenced against a database including altitudes associated with given locations. For example, a Global Positioning System (GPS) location of the vehicle may be determined and cross-referenced against such a database.

The algorithm may also account for any changes in tire pressure data that may be caused by intentional changes to the tire pressure of one or more tires of the vehicle. For example, a tire may experience a significant change in tire pressure due to a user manually adding or removing air from the tire. As another example, a user may rotate the tires of a vehicle or install new tires on the vehicle. If the sensors are at fixed locations in the vehicle (for example, if the vehicle has four tires, one sensor may capture data for a front left tire, one sensor may capture data for a front right tire, and so on), then if the tires are rotated or replaced, the sensors readings may consequentially change by a non-negligible amount. To account for these types of changes, the algorithm may analyze the tire pressure data and look for linear relationships between the tire pressure data. If the relationship between data points included within a given time frame of data capture indicates a different type of relationship (for example, a step function relationship), then this change may indicate intentional scenarios such as those described above. To account for this, if such relationships in data points are identified, then any data associated with that point in time, as well as any prior data, may be disregarded, and the algorithm may reset the tire pressure analysis by using only data points received after that given point in time. This is just one example of how such intentional changes may be accounted for, and is not intended to be limiting in any way.

In some embodiments, if it is determined that a slow leak is taking place in one or more tires of the vehicle, then an alert may be presented to a user associated with the vehicle. The alert may be presented in any number of different ways.

For example, an alert may be presented through a mobile device application and/or through the vehicle itself. If the alert if presented through the vehicle, it may be presented on the human machine interface (HMI) of the vehicle, a visual indication on a dashboard of the vehicle, an auditory indication, and/or may be presented in any other manner. The alert may include any information that may be relevant to the user, such as the specific tire that is experiencing the slow leak, the rate of leak, a time until the tire pressure will reach a threshold tire pressure level, a location of the tire where the leak is originating from, and/or any other information.

It should be noted that while, for consistency sake, reference may be made herein to identifying slow leaks in tires, these systems and methods described herein may also similarly apply to any other aspects of a vehicle that may experience a slow leak. For example, these same systems and methods could be applicable to vehicle fluids, such as engine oil, transmission oil, coolant, etc.

Turning to the figures, FIG. 1 illustrates an example system 100, in accordance with one or more embodiments of the disclosure. In some embodiments, the system 100 may include at least a vehicle 102, a tire slow leak (TSL) service 130, and/or a device 150 that may be associated with a user 152. It should be noted that any of the elements of the system 100 may be associated with any of the hardware components described with respect to the machine 1100 of FIG. 11.

In some embodiments, the vehicle 102 may include a driverless autonomous vehicles and/or driver-operated vehicle. The vehicle may also include internal combustion engines (ICE), may be a hybrid vehicle, or may be a fully electric vehicle. The vehicle 102 may include at least one or more tire sensors 110 associated with one or more tires (not depicted in the figure) of the vehicle. In some cases, each tire of the vehicle 102 may be associated with at least one sensor 110. Examples of such sensors may include tire pressure sensors, temperature sensors, and/or any other type of sensors that may be used to capture information about the tires themselves and/or external factors that may influence the tire pressure of the tires. The sensors 110 may be located inside the cabin of the vehicle 102, on the exterior of the vehicle 102, inside the tires of the vehicle 102, external to the tires of the vehicle 102, and/or any other location. The sensors 110 may capture any of the aforementioned data (and/or any other data) and may provide the data to one or more electronic control units 104 (ECUs) of the vehicle 102. The vehicle 102 may also include any other number of sensors that may not necessarily be associated with the tires of the vehicle 102.

Any of the data captured by the one or more sensors 110 (and/or any other data) may be transmitted or received over a communications network 112 using a transmission medium via the network interface device/transceiver utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver may include one or more physical jacks (e.g., Ethernet, coaxial, or phone jacks) or one or more antennas to connect to the communications network 112. In an example, the network interface device/transceiver may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution and includes digital or analog communications signals or other intangible media to facilitate communication of such software. It should be noted that while the figure may illustrate particular types of signals (for example, "cellular signal," "CAN signal," etc. as being associated with particular parts of the system, these are merely exemplary, and are not intended to be limiting).

The TSL service 130 may be a backend system. The TSL service 130 may interface with the vehicle 102, with the mobile device 150 that may be associated with the user 152, and/or any other parts of the system 100. In some cases, the TSL service 130 may be responsible for performing any of the operations described herein associated with making slow leak determinations and/or presenting an alert to a user (for example, operations described with respect to FIG. 2, FIG. 8, and/or any other operations described herein).

The device 150 may include any type of user device, such as a smartphone, laptop computer, desktop computer, tablet, and/or any other type of device. The device 150 may be capable of running an application. For example, the device 150 may include an application that may be used to display to the user 152 when one or more tires of the vehicle 102 are experiencing a slow leak condition. The application may include any information that may be relevant to the user, such as the rate at which air is leaking from the tire, an amount of time until the tire pressure crosses a threshold value, and/or any other relevant information.

Figure 2:
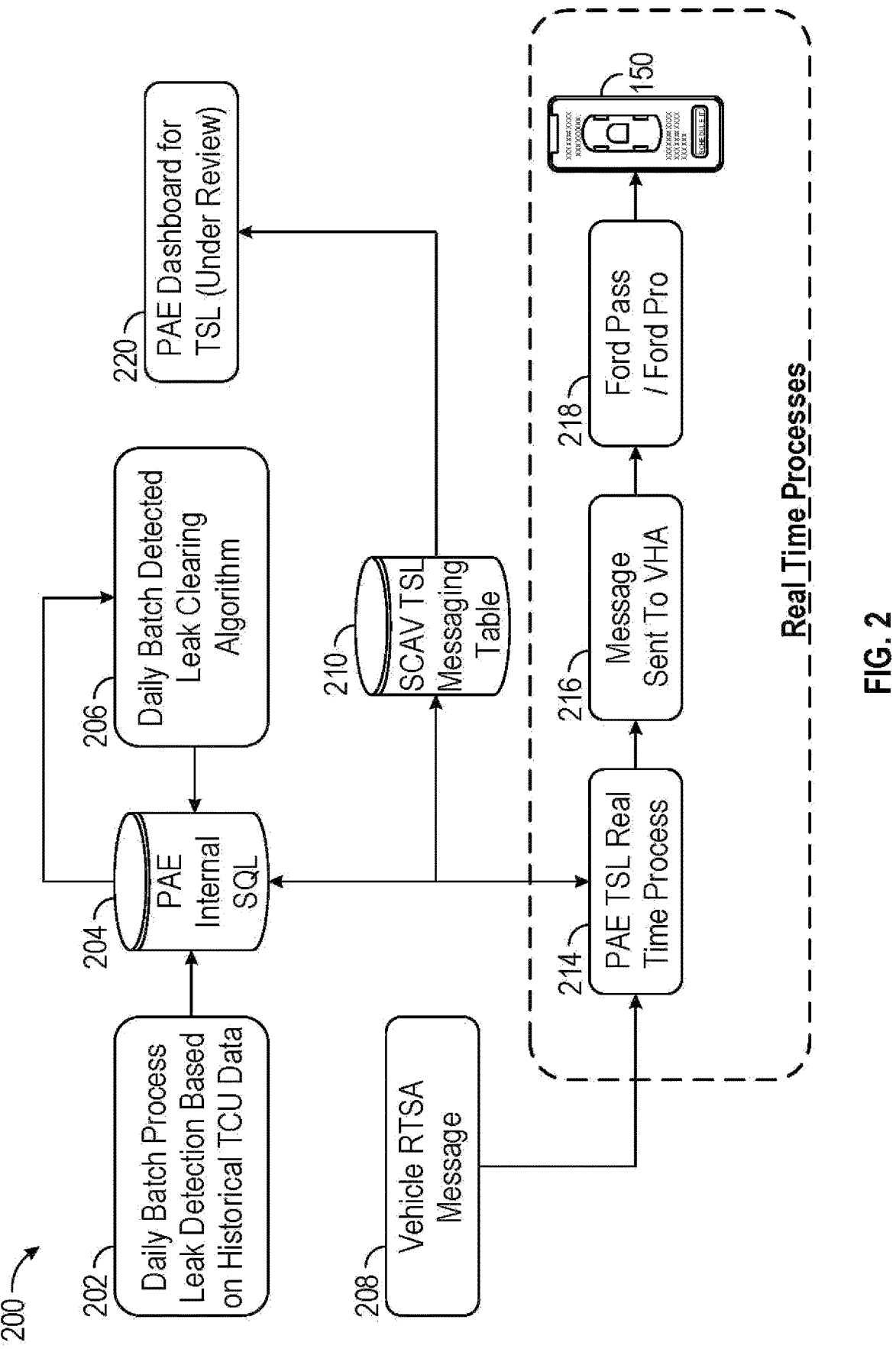
FIG. 2 illustrates an example flowchart, in accordance with one or more embodiments of the disclosure.

FIG. 2 illustrates an example flowchart 200, in accordance with one or more embodiments of the disclosure. The flowchart 200 may illustrate a high level overview of operations that may be performed in association with the systems and methods described herein. However, the operations depicted in the flowchart 200 are not intending to be limiting in any way, and any other operations may also be applicable. As indicated in the figure, some of the operations may involve batch processes that may be performed in order to update a database 204. In some cases, the database 204 may include tire pressure information for various tires of various different vehicles. For example, tire pressure data for a specific vehicle may be stored in association with a vehicle identification number (VIN) of the vehicle, or any other type of identifier. That is, the database 204 may store historical tire pressure information for that vehicle based on tire pressure readings obtained from the vehicle. The database 204 may also store other types of information, such as thresholds applicable to the specific vehicle, and/or any other types of information.

The batch processes may include at least a leak detection operation (for example, operation 202) and/or a leak clearing operation (for example, operation 206). Leak detection may refer to the part of the service that detects a leak in the tire. The leak clearing may refer to a separate algorithm, still part of the overall leak detection system, that statistically checks for a change in the tire pressure time series behavior. If a change is detected, it may be assumed that the customer performed an intervention on the tire of interest. The result in the algorithm may be that the leak detection algorithm resets itself for the 'cleared' tire.

The operations described with respect to the flowchart 200 may also involve the use of a messaging table 210. The messaging table may be an internal database that records all of the leak decisions from the algorithm and what tires had an associated message passed on to the an application of a user device. The messaging table 210 may be used to monitor the tire leak service and to measure key performance indicators. Additionally, a dashboard 220 may be used as an internal tool for monitor the algorithms performance and usefulness. The dashboard 220 may assist with diagnose issues with the algorithm or identify where enhancements can be made.

Finally, in some cases, the operations performed in association with the flowchart 200 may also include real-time operations (for example, operations 208, 214, 216, and/or 218). These real-time processes may involve operations performed in real-time during use of the vehicle (and/or even during times when the vehicle is not in use as well). These operations, for example, may include collecting tire pressure data or data from vehicle sensors relating to other external factors (for example, external factors as described herein or otherwise), making real-time tire leak determinations, providing alerts to customers, etc. In some cases, the real-time operations may include sending messages to a vehicle health alert (VHA) 216. VHA 216 may be a system similar to PAE that operation on real time messages. VHA focuses on diagnostic alerts that are sent to the cloud from the vehicle. VHA then process the alerts and sends messages to an application on a user mobile device or to a fleet telematics application. VHA may include most of the infrastructure to pass messages to the different user interfaces, so PAE may simply pass messages to VHA, and let VHA handle message coordination. However, this specific configuration involving the use of PAE and VHA may not necessarily be intended to be limiting.

Figures 3A, 3B:
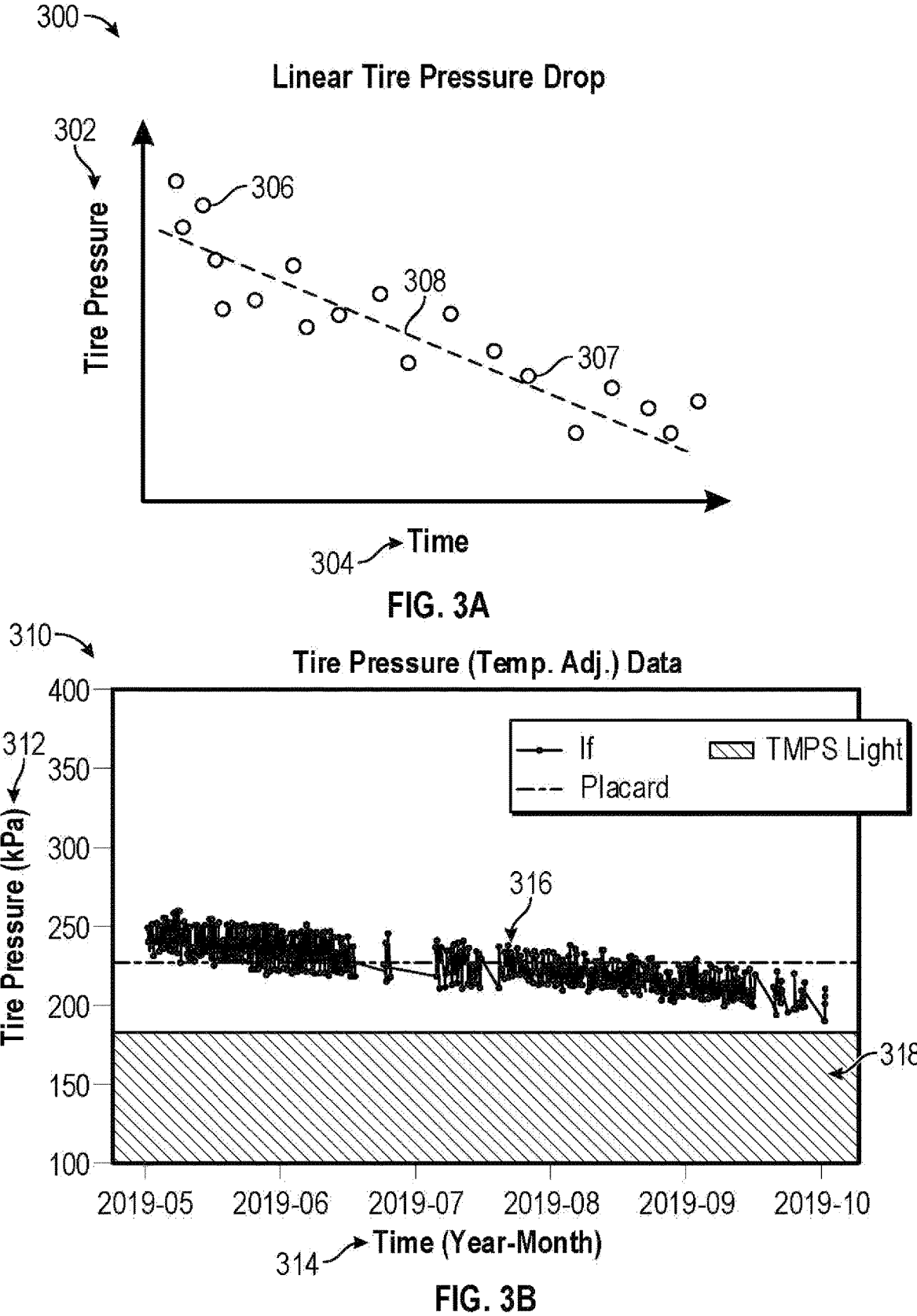
FIGS. 3A-3B illustrate example plots, in accordance with one or more embodiments of the disclosure.

FIGS. 3A-3B illustrate example plots showing example tire pressure data, in accordance with one or more embodiments of the disclosure. Beginning with FIG. 3A, plot 300 includes a y-axis 302 associated with tire pressure readings and an x-axis 304 associated with time. Thus, the plot 300 shows tire pressure readings over time. The plot 300 may include various data points, such as data point 306 and data point 307, which may be indicative of tire pressure readings at various points in time. For example, data point 306 may represent a tire pressure reading at a first time, and data point 307 may represent a tire pressure reading at a second time. The plot 300 may also illustrate a linear fit 308, which may be a closest linear representation of an overall slope trend of the data points. For example, as indicated in the plot 300, the data points generally exhibit a downward trend in tire pressure over time, which results in the linear fit with the negative slope. The linear fit 308 provides a representation of the rate at which the tire pressure(s) of the tire(s) represented by the data points are changing over time (increasing, decreasing, or remaining the same). At high level (with more specific implementation details being described herein), the slope of this linear fit 308 may be used to determine if a slow leak is occurring in a particular tire.

In some cases, raw tire pressure data obtained for various tires of a vehicle may also be post-processed to account for external factors that may influence the data. Examples of such external factors may include temperature, altitude, road surface conditions, atmospheric pressure, sun-load, vehicle load, and/or any other factors. For example, warmer tires may be associated with a higher tire pressure. These factors may be taken into account using vehicle sensors, third party data, and/or information about the location of the vehicle.

For example, temperature information may be received from a third party service. Temperature information may also be captured by temperature sensors included inside and/or outside of the vehicle, and/or inside the internal cavities of the tires of the vehicle. Altitude information may be obtained from an altimeter included with the vehicle, or may be determined based on location information associated with the vehicle, which may be cross-referenced against a database including altitudes associated with given locations. For example, a GPS location of the vehicle may be determined and cross-referenced against such a database.

Turning to FIG. 3B, the plot 310 may also include a y-axis 312 associated with tire pressure readings and an x-axis 314 associated with time. The plot 310 may also include various data points 316, which may also be associated with a linear fit. The plot 310 may serve to illustrate that the analysis and alerts produced by these systems and methods may be supplementary to alerts provided by the TPMS indicative of an underinflated tire and/or a flat tire. For example, the TPMS may be associated with a threshold tire pressure 318. Below this threshold tire pressure 318, the TPMS may be triggered to indicate that the tire may be an underinflated tire and/or a flat tire. Even before this happens, however, the systems and methods described herein may analyze the linear fit of the tire pressure data in order to identify if a slow leak is occurring in the tire before the TPMS flat tire indication is triggered.

Figure 4:
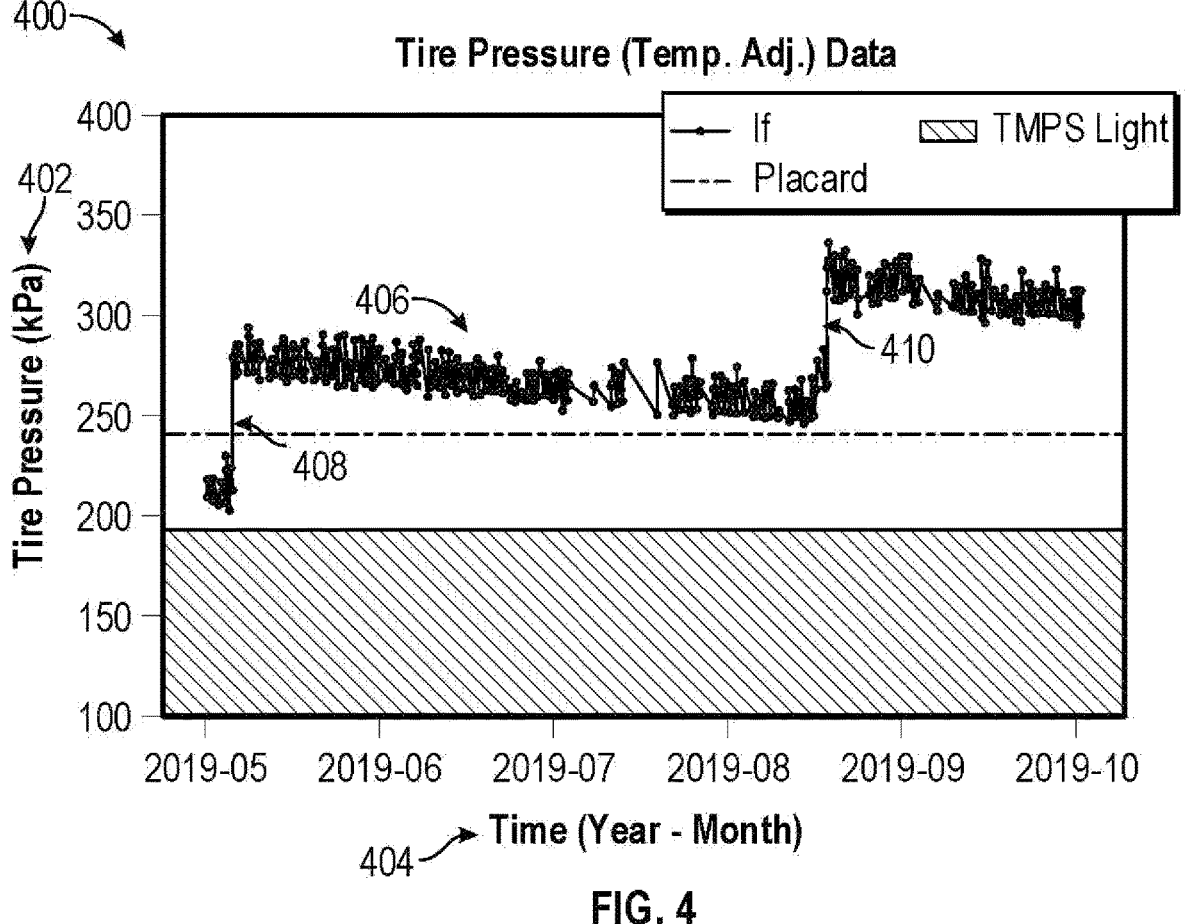
FIG. 4 illustrates an example plot, in accordance with one or more embodiments of the disclosure.
Figure 7:
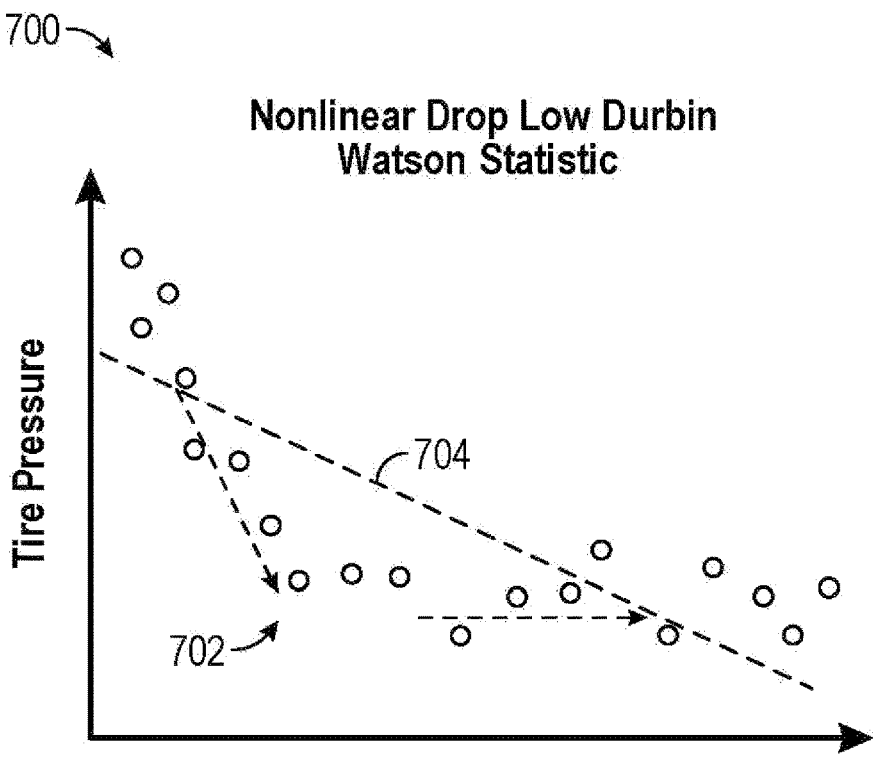
FIG. 7 illustrates example plots, in accordance with one or more embodiments of the disclosure.
Figure 7:
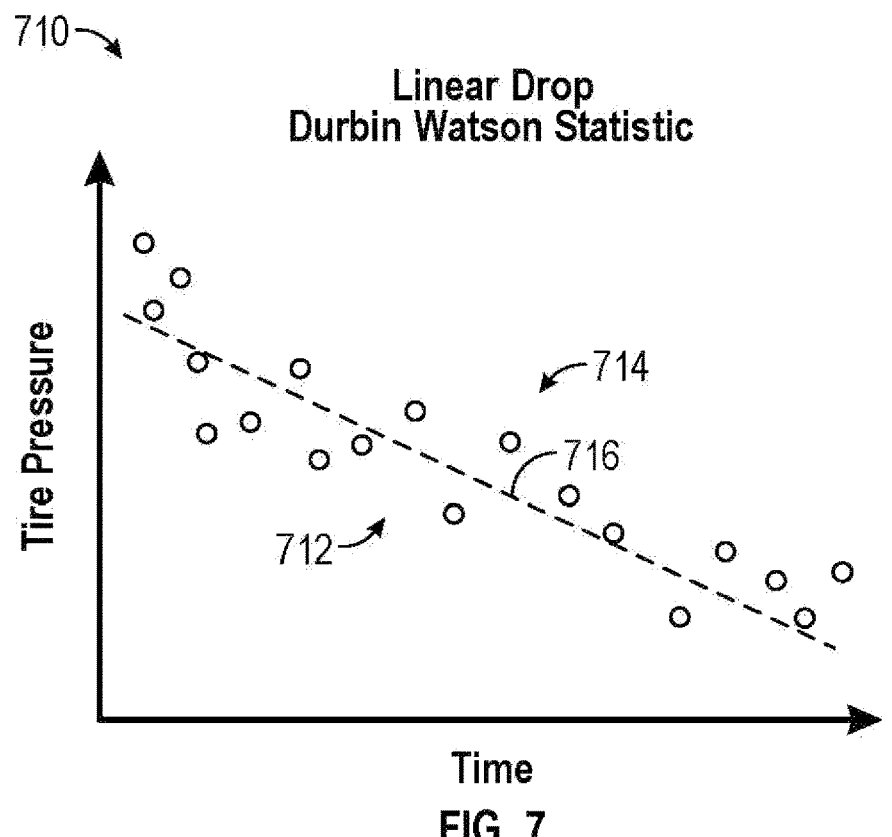

FIG. 4 illustrates an example plot 400 indicating tire inflation events, in accordance with one or more embodiments of the disclosure. The plot 400 may also include a y-axis 402 associated with tire pressure readings and an x-axis 404 associated with time. The plot 400 may also include various data points 406. The plot 400 may serve to illustrate scenarios where tire pressure readings may experience significant changes due to external events, such as a user adding air to a tire. For example, as depicted in the plot 408, the data points 406 may indicate a first jump 408 and a second jump 410 in the tire pressure readings. The first jump 408 and second jump 410 may indicate that a user may be adding air into the tire that may result in the tire pressure data experiencing the significant increases in value over a short period of time. The algorithm may account for these types of changes in the data by filtering out any "step changes" in data points (for example, trends more indicative of a step function than a linear change). For example, if a significant change in data (such as the first jump 408 and the second jump 410) is identified in the data, any data captured prior to that point in time may be disregarded in the slow leak analysis. In this manner, the algorithm may essentially "reset" the analysis to account for the new baseline tire pressure level resulting from the external event. At least FIGS. 5 and 7 provide additional details regarding how a step function type of data relationship may be identified within a collection of data points.

Figure 5:
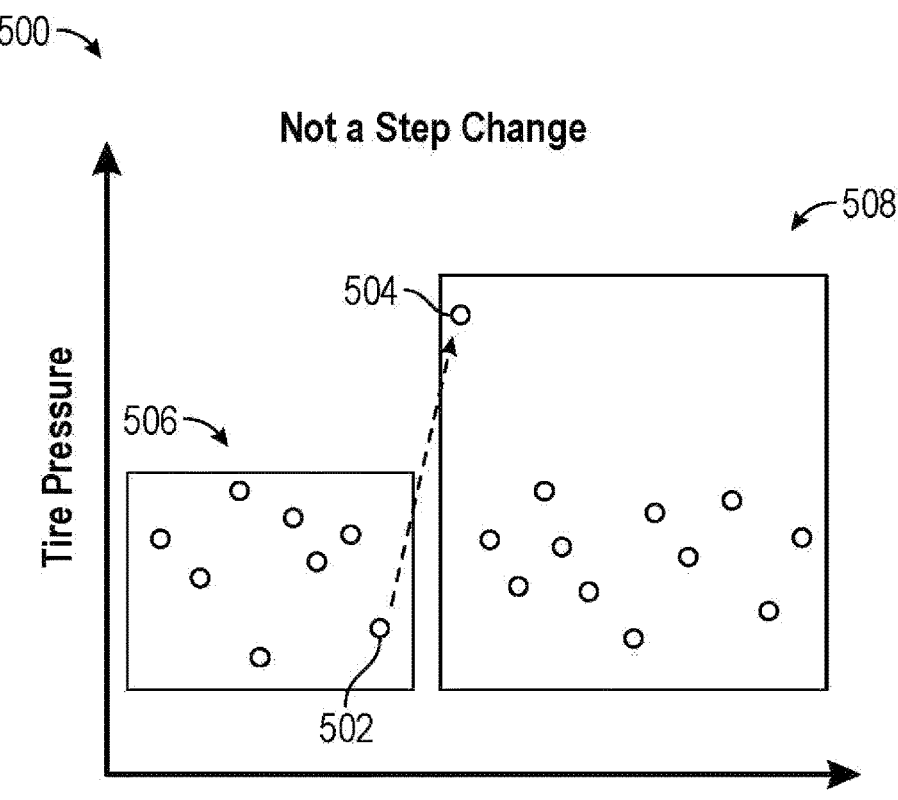
FIG. 5 illustrates an example plot, in accordance with one or more embodiments of the disclosure.
Figure 5:
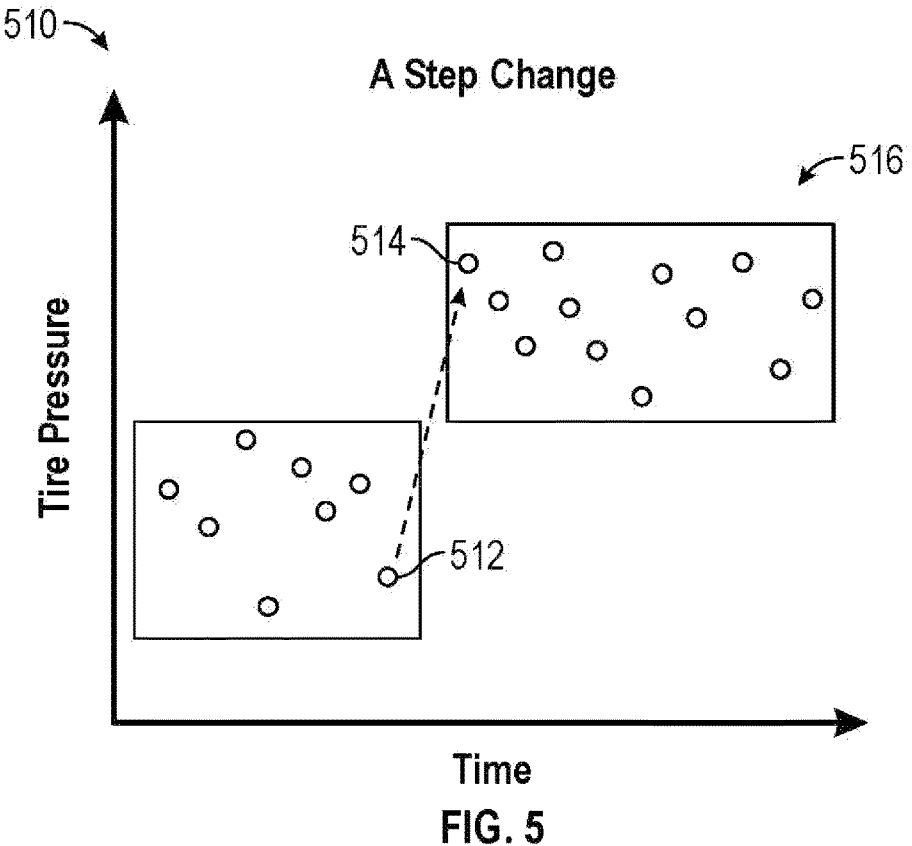

FIG. 5 illustrates example plots, in accordance with one or more embodiments of the disclosure. The plots provide additional details about how it may be determined if a significant change in tire pressure data is actually indicative of a step-function relationship, or if one of the data points is simply an outlier. As mentioned above, determining changes in tire pressure between two or more data points that exceeds a particular threshold may indicate an intentional adjustment to the tire pressure (for example, a user adding air into a tire), and thus this data and/or any prior data may be disregarded to account for this intentional change. However, in some cases, a difference in tire pressure between two data points may exceed this particular threshold, but the change may actually be caused by an outlier data point rather than an intentional adjustment to the tire pressure of the tire. This scenario is illustrated in the plot 500. In plot 500, the difference between data point 502 and data point 504 may initially appear to be indicative of a step function relationship, however, the difference is actually the result of the data point 504 being an outlier from the other data points in the overall collection of data points. In order to detect this type of scenario, individual data points may be compared to nearby data points (for example, data points captured within a given timeframe similar to when the potential outlier data point was captured). For example, as depicted in the plot 500, the data point 504 may be compared to one or more other data points in a first collection of data points 508 captured subsequent to the data point 504. By making this comparison, it may be determined that the tire pressure indicated in the data point 504 is significantly larger than all of the other data points in the first collection of data points 508. Based on this, it may be determined that data point 504 is an outlier, and not actually indicative of a step function type change in the tire pressure readings.

While plot 500 shows a scenario where a change is actually caused by an outlier data point rather than an intentional adjustment to the tire pressure of the tire, plot 510 shows an example of a scenario where a change is actually indicative of a step function. As shown in plot 510, the difference between the data point 512 and data point 514 may be similar to the difference between data point 502 and data point 504 of plot 500. However, in plot 510, the difference between the data point 514 and the second collection of data points 516 taken after the data point 514 may be much closer in magnitude than the difference between the data point 504 and the first collection of data points 508 in plot 500. This similarity between the data point 514 and the second collection of data points 516 may indicate that the data point 514 may not be an outlier and that the difference between the data point 512 and the data point 514 may actually be indicative of a step-function-like change in the tire pressure readings.

Figure 6:
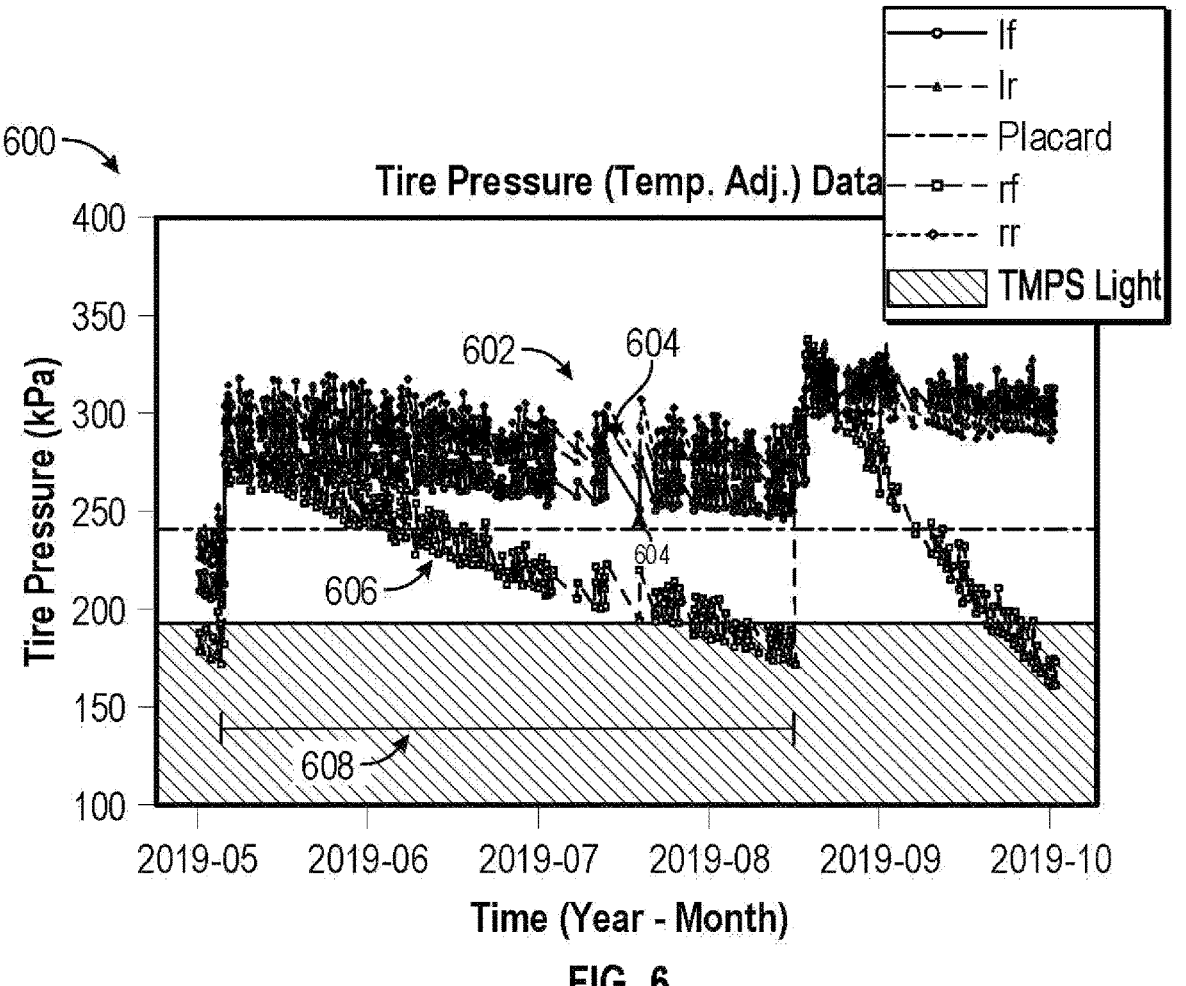
FIG. 6 illustrates an example plot, in accordance with one or more embodiments of the disclosure.

FIG. 6 illustrates a plot 600, in accordance with one or more embodiments of the disclosure. The plot 600 may provide one example of how it may be determined that a tire is experiencing a slow leak. In this example, a slow leak may be identified by comparing tire pressure data associated with one tire of the vehicle to tire pressure data associated with one or more other tires of the vehicle. The plot 600 may depict tire pressure reading data sets for four different tires of a vehicle. For example, the plot 600 includes a first data set 602 for a first tire, a second data set 604 for a second tire, a third data set 606 for a third tire, a fourth data set 608 for a fourth tire. The algorithm may compare the tire pressure readings associated with the data sets of each tire of the vehicle in order to determine if a particular tire is experiencing a slow leak condition. This comparison may be made in any number of different ways. For example, the slopes of the different data sets may be taken at different times and compared to one another. As a second example, raw tire pressure data points taken from different tires at the same time may be compared. As a third example, a collection of data points may be compared, such as an average of a set of data points for a given tire within a given time frame. If any of these comparisons reveal that the data associated with one or more of the tires is more than a threshold amount different than the data for the other tires, then this may be an indication that the one or more tires are experiencing a slow leak condition. As one example, if the comparison involves comparison of the slopes of linear fits of the different data sets, then a slope (or the absolute value of the slope) of the third data set 606 for the third tire taken within a first time frame 608 may be greater than a threshold amount greater than the slope (or the absolute value of the slopes) of the data sets of the other three tires of the vehicle. This may indicate that the third tire is experiencing a slow leak.

Another example of a manner in which a slow leak may be identified may include comparing tire pressure data for one tire against historical tire pressure data for that same tire and/or other tires of the vehicle. This historical tire pressure data may be stored locally at the vehicle or at a remote database. The comparison may involve comparing data to historical data associated only with that particular vehicle (for example, VIN-specific data), or may apply to all vehicles of the same make/model/year using the same types of tires, for example. In some cases, a combination of comparisons between data associated with different tires of the vehicle and a comparison between current data and historical data may be employed. Additionally, any other types of comparisons or determinations may be performed to identify the slow leak. That is, the examples provided above are not intended to be limiting in any way.

FIG. 7 illustrates example plots (for example, plot 700 and plot 710), in accordance with one or more embodiments of the disclosure. The plot 700 and plot 710 may illustrate the use of statistics to further assist the algorithm in determining if a collection of tire pressure reading data is indicative of a linear change in tire pressure readings or a non-linear change in tire pressure readings. In some cases, this determination may be made using any statistical analyses. For example, a Durbin-Watson Test is one manner by which the linearity of the data may be ascertained. The Durbin-Watson Test may be a measure of autocorrelation (also called serial correlation) in residuals from regression analysis. Autocorrelation is the similarity of a time series over successive time intervals. It can lead to underestimates of the standard error and can cause you to think predictors are significant when they are not. Continuing this specific example, the Durbin-Watson Test may be used to determine the linearity of a collection of tire pressure readings by ascertaining a ratio of data points above a linear fit line and below a linear fit line. For example, if there is not a relatively similar number of data points above the linear fit as below the linear fit, it may be an indication that the data may not properly be represented as data representing a linear trend.

Plot 700 illustrates a scenario where a collection of tire pressure reading data is indicative of a non-linear change in tire pressure readings. As illustrated in plot 700, the tire pressure readings may include a first collection of data points 702 including a large number of tire pressure readings below a closest linear fit 704. This may result in a lower Durbin-Watson value. In some cases, a threshold range of Durbin-Watson values may be used to determine the linearity of a data set. For example, the Durbin-Watson test provides a score between 0 and 4. A value of 2 means no autocorrelation and a linear pattern. A value near 0 indicates positive autocorrelation, and value near 4 indicates negative autocorrelation. This is just one non-limiting example of values that may be applicable, and any other values and/or score ranges may also be used. Durbin-Watson In contrast, the plot 710 illustrates a scenario where a collection of tire pressure reading data is indicative of a linear change in tire pressure readings. For example, in contrast with the plot 700, which includes a large number of data points on one side of the linear fit within the same time frame, the plot 710 includes a relatively even number of data points on either side of the linear 714 (as represented by the second collection of data points 712 and the third collection of data points 714). This may result in a higher Durbin-Watson value compared to the case in plot 700.

Figure 8:
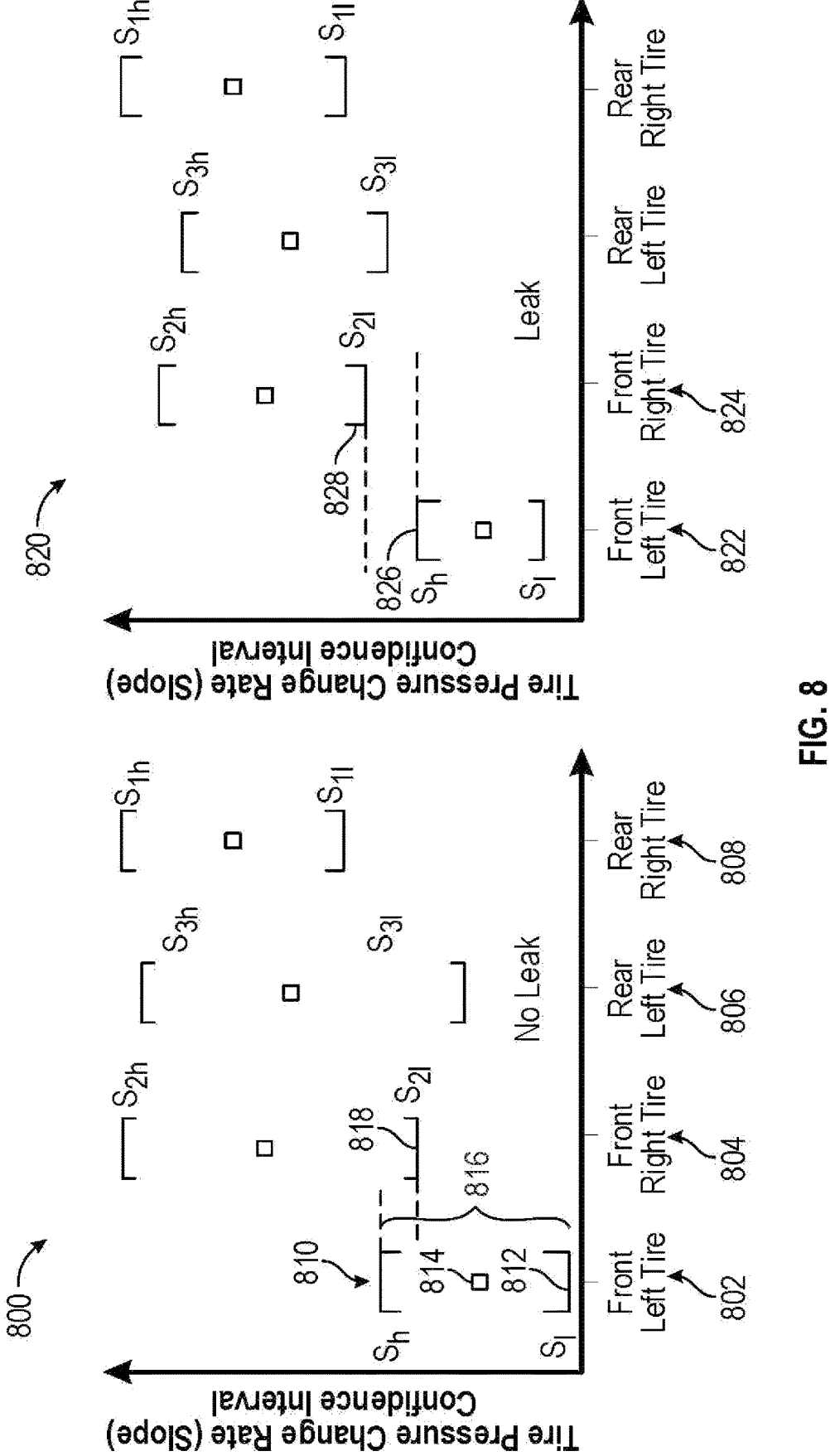
FIG. 8 illustrates example plots, in accordance with one or more embodiments of the disclosure.

FIG. 8 illustrates example plots, in accordance with one or more embodiments of the disclosure. The plots (for example, plot 800 and plot 810) may illustrate that a confidence interval may be used for tire pressure readings captured for any given tires of a vehicle. This may allow the algorithm to account for any error in data capture. As illustrated in the plot 800, each individual tire may be associated with its own confidence interval. For example, a first tire may have a first confidence interval 802, a second tire may have a second confidence interval 804, a third tire may have a third confidence interval 806, a fourth tire may have a fourth confidence interval 808. The number of confidence intervals may also vary depending on the number of tires being analyzed. In some cases, the confidence intervals may be associated with the determined slopes of the tire pressure reading data sets captured for given tires. However, the confidence intervals may also be employed with any other types of data if the slope of the tire pressure readings is not employed to identify the slow leak condition. Using the confidence interval 802 for the first tire as an example, the confidence interval 802 may include an average slope 814, which may form an overall representation of the slope of a given set of tire readings for that vehicle. However, the use of the average slope is not intended to be limiting, and any other statistical value may be used (for example, mean, median, etc.). The confidence interval 802 may also include a range 816 of values above and below the average slope 814 as represented by an upper bound 810 representing the largest tire pressure reading of the range 816, and a lower bound 812 representing the lowest tire pressure reading of the range 816. It should be noted that within the plots 800 and 820, moving further along the y-axis away from the zero point illustrates moving in the positive direction and moving closer to the zero point is towards the negative direction. Therefore, the average slope values being plotted may not be representative of the absolute value of the slopes, but may instead be representative of the signed valued of the slopes. This may be why an average slope value that is closer to the zero point of the y-axis (for example, average slope 814) is more indicative of a slow leak, as that tire may be associated with a slope that is a greater negative value than the average slope values of the other tires.

With the confidence intervals established, in order to account for error when making a slow leak determination, an upper bound of tire pressure readings associated with a particular tire that is determined to potentially be experiencing a slow leak may be compared to a lower bound of a confidence interval of another tire associated with the vehicle. For example, as illustrated in the plot 800, the first tire associated with confidence interval 802 may potentially be experiencing a slow leak because the slope of the tire pressure data may be a larger negative slope than the slope of the tire pressure data for the other three tires. To confirm that this is not the result of error associated with the readings, the upper bound 810 of the first confidence interval 802 may be compared to a second lower bound 818 of the second confidence interval 804 associated with the second tire. In the scenario illustrated by the plot 800, the upper bound 810 of the first confidence interval 802 associated with the first tire is above the second lower bound 818 of the second confidence interval 804 associated with the second tire. Given this, it may be determined that a slow leak condition is not taking place within the first tire because the confidence intervals of the first tire and the second tire are overlapping to some extent.

Plot 820 may illustrate a scenario in which it may be determined that, even taking the confidence intervals into consideration to account for error, the first tire may still be determined to be experiencing a slow leak. For example, the plot 820 may depict a fifth confidence interval 822 that may be associated with the same first tire and a sixth confidence interval 824 associated with the same second tire. However, plot 820 may illustrate that the upper bound 826 of the fifth confidence interval 822 associated with the first tire is less than the lower bound 828 of the sixth confidence interval 824 associated with the second tire. In this case, it may be determined, that even taking into account error in the tire pressure data, the slope of the tire pressure data for the first tire is likely indicative of a slow leak in the first tire.

Figures 9, 10:
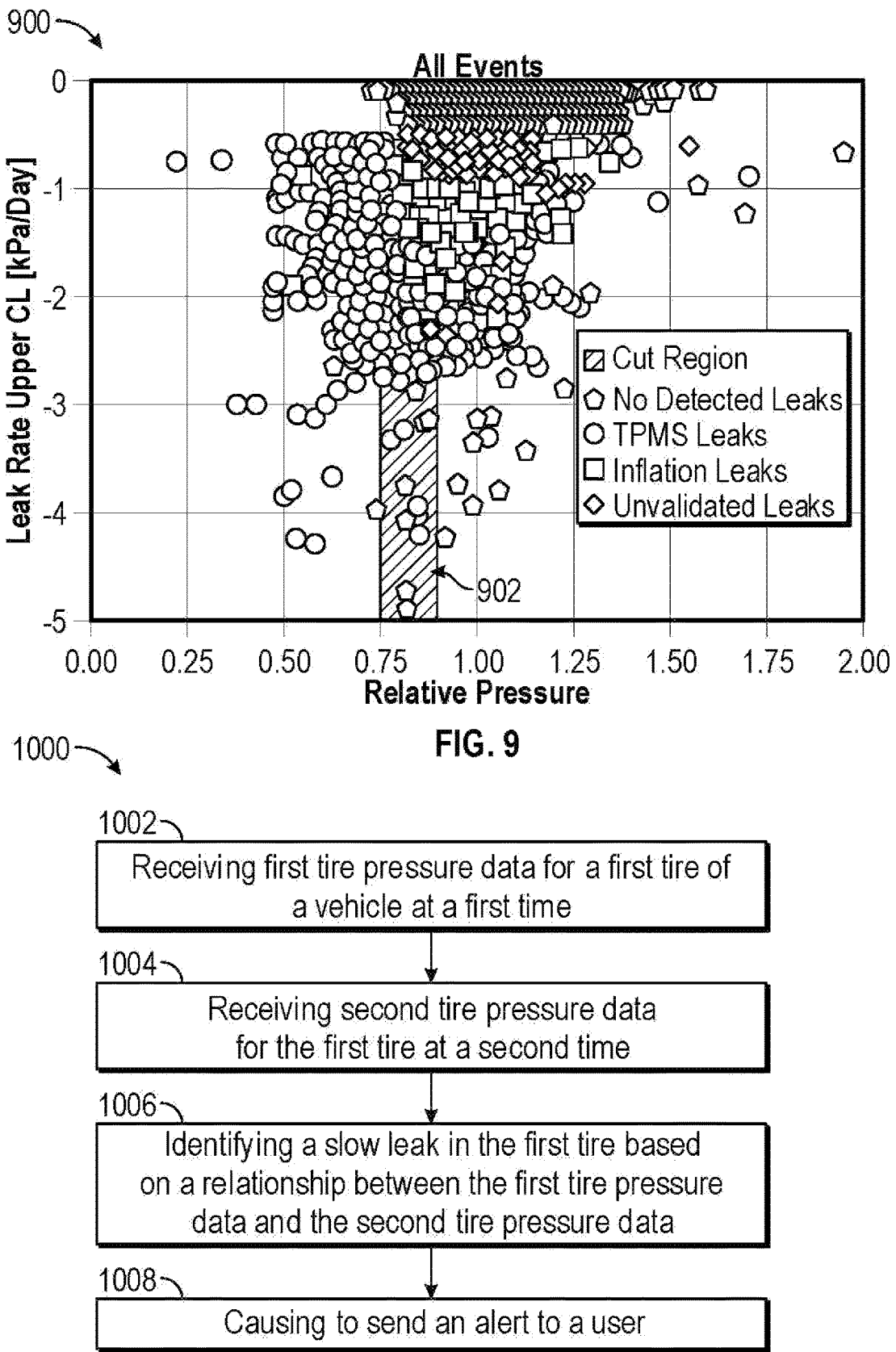
FIG. 9 illustrates an example plot, in accordance with one or more embodiments of this disclosure.
FIG. 10 illustrates an example method, in accordance with one or more embodiments of this disclosure.

FIG. 9 illustrates an example plot 900, in accordance with one or more embodiments of the disclosure. The cut region 902 may identify the region in the plane defined by the axes of the plot 900, where it is determined a leak is sufficient to pass a message onto a customer. In some cases, if a detected leak falls outside this region, no message is sent.

FIG. 10 illustrates an example method 1000, in accordance with one or more embodiments of this disclosure. At block 1002, the method 1000 may include receiving first tire pressure data for a first tire of a vehicle at a first time. At block 1004, the method 1000 may include receiving second tire pressure data for the first tire at a second time. At block 1006, the method 1000 may include identifying a slow leak in the first tire based on a relationship between the first tire pressure data and the second tire pressure data. At block 1008, the method 1000 may include causing to send an alert to a user.

Figure 11:
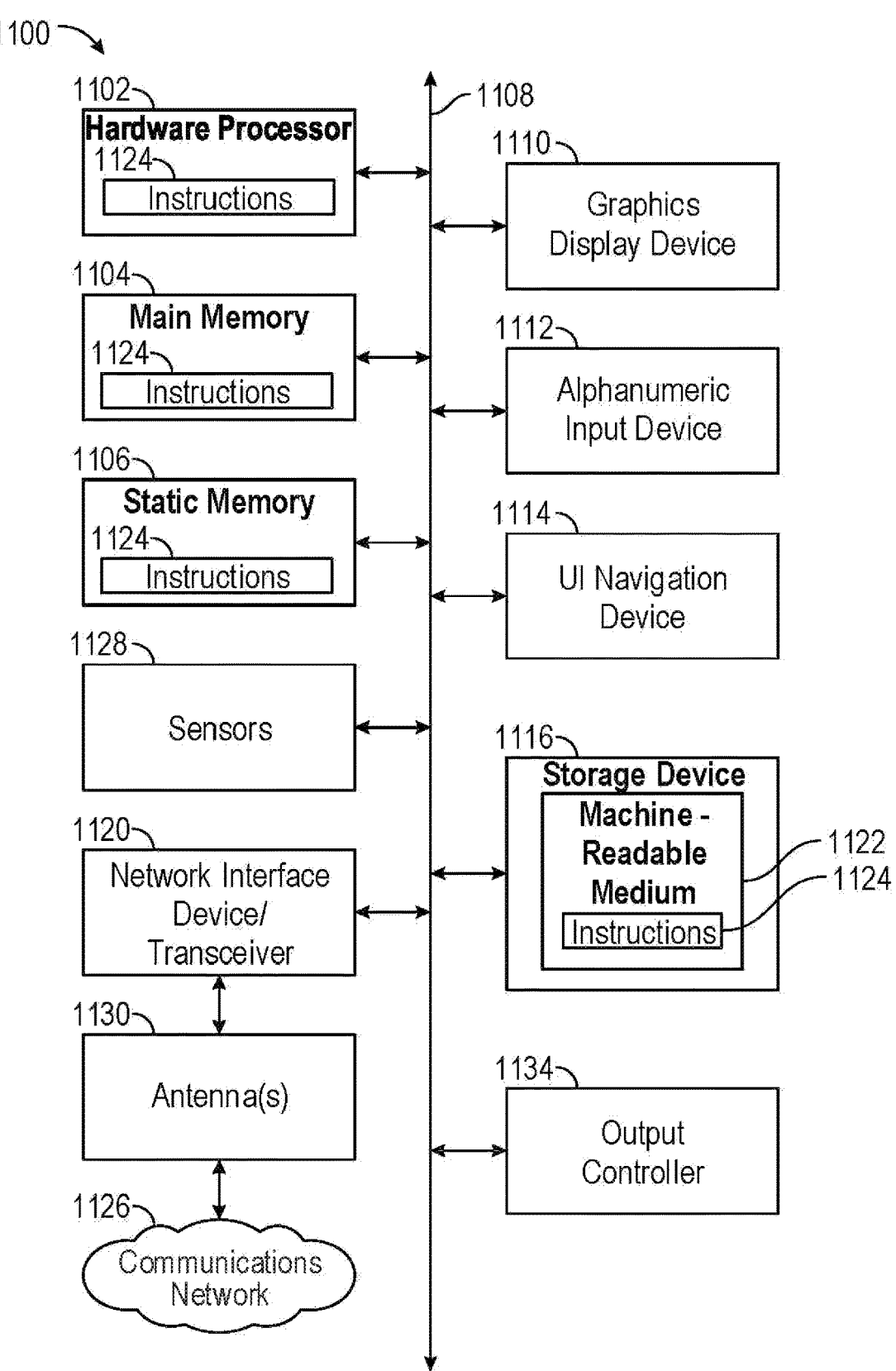
FIG. 11 illustrates an example of a computing system, in accordance with one or more embodiments of this disclosure.

FIG. 11 depicts a block diagram of an example machine 1100 upon which any of one or more techniques (e.g., methods) may be performed, in accordance with one or more example embodiments of the present disclosure. In other embodiments, the machine 1100 may operate as a stand-alone device or may be connected (e.g., networked) to other machines. In a networked deployment, the machine 1100 may operate in the capacity of a server machine, a client machine, or both in server-client network environments. In an example, the machine 1100 may act as a peer machine in peer-to-peer (P2P) (or other distributed) network environments. The machine 1100 may be a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 1100 may include a hardware processor 1102 (e.g., a central processing unit (CPU), a graphics processing unit (GPU), a hardware processor core, or any combination thereof), a main memory 1104 and a static memory 1106, some or all of which may communicate with each other via an interlink (e.g., bus) 1108. The machine 1100 may further include a graphics display device 1110, an alphanumeric input device 1112 (e.g., a keyboard), and a user interface (UI) navigation device 1114 (e.g., a mouse). In an example, the graphics display device 1110, alphanumeric input device 1112, and UI navigation device 1114 may be a touch screen display. The machine 1100 may additionally include a storage device (i.e., drive unit) 1116, a network interface device/transceiver 1120 coupled to antenna(s) 1130, and one or more sensors 1128, such as a global positioning system (GPS) sensor, a compass, an accelerometer, or other sensor. The machine 1100 may include an output controller 1134, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)).

The storage device 1116 may include a machine readable medium 1122 on which is stored one or more sets of data structures or instructions 1124 (e.g., software) embodying or utilized by any one or more of the techniques or functions described herein. The instructions 1124 may also reside, completely or at least partially, within the main memory 1104, within the static memory 1106, or within the hardware processor 1102 during execution thereof by the machine 1100. In an example, one or any combination of the hardware processor 1102, the main memory 1104, the static memory 1106, or the storage device 1116 may constitute machine-readable media.

While the machine-readable medium 1122 is illustrated as a single medium, the term "machine-readable medium" may include a single medium or multiple media (e.g., a centralized or distributed database, and/or associated caches and servers) configured to store the one or more instructions 1124.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 1100 and that cause the machine 1100 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 1124 may further be transmitted or received over a communications network 1126 using a transmission medium via the network interface device/transceiver 1120 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 1120 may include one or more physical jacks (e.g., Ethernet, coaxial, or phone jacks) or one or more antennas to connect to the communications network 1126. In an example, the network interface device/transceiver 1120 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 1100 and includes digital or analog communications signals or other intangible media to facilitate communication of such software. The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

Further, in the present specification and annexed drawings, terms such as "store," "storage," "data store," "data storage," "memory," "repository," and substantially any other information storage component relevant to the operation and functionality of a component of the disclosure, refer to memory components, entities embodied in one or several memory devices, or components forming a memory device. It is noted that the memory components or memory devices described herein embody or include non-transitory computer storage media that can be readable or otherwise accessible by a computing device. Such media can be implemented in any methods or technology for storage of information, such as machine-accessible instructions (e.g., computer-readable instructions), information structures, program modules, or other information objects.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language generally is not intended to imply that features, elements, and/or operations are in any way required for one or more implementations or that one or more implementations necessarily include logic for deciding, with or without user input or prompting, whether these features, elements, and/or operations are included or are to be performed in any particular implementation.

What has been described herein in the present specification and annexed drawings includes examples of systems, devices, techniques, and computer program products that, individually and in combination, certain systems and methods. It is, of course, not possible to describe every conceivable combination of components and/or methods for purposes of describing the various elements of the disclosure, but it can be recognized that many further combinations and permutations of the disclosed elements are possible. Accordingly, it may be apparent that various modifications can be made to the disclosure without departing from the scope or spirit thereof. In addition, or as an alternative, other embodiments of the disclosure may be apparent from consideration of the specification and annexed drawings, and practice of the disclosure as presented herein. It is intended that the examples put forth in the specification and annexed drawings be considered, in all respects, as illustrative and not limiting. Although specific terms are employed herein, they are used in a generic and descriptive sense only and not for purposes of limitation.

What is claimed is:

1. A system comprising:
a processor; and
a memory storing computer-executable instructions, that when executed by the processor, cause the processor to:
receive first tire pressure data for a first tire of a vehicle at a first time;
receive second tire pressure data for the first tire at a second time;
adjust the first tire pressure data based on altitude data or temperature data;
receive third tire pressure data and fourth tire pressure data for the first tire;
determine that a first difference between the third tire pressure data and the fourth tire pressure data is greater than a first threshold amount;
receive, subsequent to receiving the third tire pressure data, fifth tire pressure data for the first tire;
determine a second difference between the fourth tire pressure data and the fifth tire pressure data;
determine, based on the first difference and the second difference, that a rate at which air is leaving the first tire is a non-linear rate;
determine, based on determining that the rate at which air is leaving the first tire is a non-linear rate, that the fifth tire pressure data indicates that an intentional change in tire pressure is occurring;
filter out the fifth tire pressure data based on the determination that the fifth tire pressure data indicates that an intentional change in tire pressure is occurring such that the fifth tire pressure data is disregarded in determining whether a slow leak is occurring in the first tire;
identify a slow leak in the first tire based on a relationship between the first tire pressure data and the second tire pressure data without considering the fifth tire pressure data; and
cause to send an alert to a user indicating the slow leak.
2. The system of claim 1, wherein the computer-executable instructions further cause the processor to:
receive third tire pressure data for a second tire of the vehicle; and
receive fourth tire pressure data for the second tire, wherein identifying the slow leak in the first tire is further based on a determination that a difference between the first tire pressure data and the second tire pressure data is greater than a difference between the third tire pressure data and the fourth tire pressure data.
3. The system of claim 2, wherein the computer-executable instructions further cause the processor to:
determine a first confidence interval associated with the first tire pressure data, the first confidence interval comprising a first upper bound and a first lower bound; and
determine a second confidence interval associated with the second tire pressure data, the second confidence interval comprising a second upper bound and a second lower bound,
wherein identifying the slow leak in the first tire is further based on a determination that the second upper bound associated with the second tire is less than the first lower bound of the first tire.
4. The system of claim 1, wherein identifying the slow leak in the first tire is further based on historical tire pressure data associated with the vehicle.
5. The system of claim 1, wherein the computer-executable instructions further cause the processor to:
receive fifth tire pressure data for the first tire;
receive sixth tire pressure data for the first tire;
determine that a difference between the fifth tire pressure data and the sixth tire pressure data is greater than a first threshold amount;
receive, subsequent to receiving the sixth tire pressure data, seventh tire pressure data for the first tire;
determine a difference between the sixth tire pressure data and the seventh tire pressure data;
determine, based on the difference between the fifth tire pressure data and the sixth tire pressure data and the difference between the sixth tire pressure data and the seventh tire pressure data, that the fifth tire pressure data and the sixth tire pressure data represent a non-linear relationship;
determine, based on determining that the fifth tire pressure data and the sixth tire pressure data represent a non-linear relationship, that the difference between the fifth tire pressure data and the sixth tire pressure data is an intentional change in tire pressure; and
filter out the sixth tire pressure data based on the determination that the difference between the fifth tire pressure data and the sixth tire pressure data is an intentional change in tire pressure.
6. The system of claim 1, wherein the computer-executable instructions further cause the processor to:
determine that a Durbin-Watson statistic associated with the first tire pressure data and the second tire pressure data is greater than a second threshold and less than a third threshold.
7. A method comprising:
receiving first tire pressure data for a first tire of a vehicle at a first time;
receiving second tire pressure data for the first tire at a second time;
adjusting the first tire pressure data based on one or more external factors, the one or more external factors including at least one of: an altitude or a temperature;
receiving third tire pressure data and fourth tire pressure data for the first tire;
determining that a first difference between the third tire pressure data and the fourth tire pressure data is greater than a first threshold amount;

receiving, subsequent to receiving the third tire pressure data, fifth tire pressure data for the first tire;

determining a second difference between the fourth tire pressure data and the fifth tire pressure data;

determining, based on the first difference and the second difference, that a rate at which air is leaving the first tire is a non-linear rate;

determine, based on determining that the rate at which air is leaving the first tire is a non-linear rate, that the fifth tire pressure data indicates that an intentional change in tire pressure is occurring;

filtering out the fifth tire pressure data based on the determination that the fifth tire pressure data indicates that an intentional change in tire pressure is occurring such that the fifth tire pressure data is disregarded in determining whether a slow leak is occurring in the first tire;

identifying a slow leak in the first tire based on a relationship between the first tire pressure data and the second tire pressure data without considering the fifth tire pressure data; and causing to send an alert to a user indicating the slow leak.

8. The method of claim 7, further comprising:

receiving third tire pressure data for a second tire of the vehicle; and receiving fourth tire pressure data for the second tire, wherein identifying the slow leak in the first tire is further based on a determination that a difference between the first tire pressure data and the second tire pressure data is greater than a difference between the third tire pressure data and the fourth tire pressure data.

9. The method of claim 8, further comprising:

determining a first confidence interval associated with the first tire pressure data, the first confidence interval comprising a first upper bound and a first lower bound; and determining a second confidence interval associated with the second tire pressure data, the second confidence interval comprising a second upper bound and a second lower bound, wherein identifying the slow leak in the first tire is further based on a determination that the second upper bound associated with the second tire is less than the first lower bound of the first tire.

10. The method of claim 7, wherein identifying the slow leak in the first tire is further based on historical tire pressure data associated with the vehicle.

11. The method of claim 7, further comprising:

determining that a Durbin-Watson statistic associated with the first tire pressure data and the second tire pressure data is greater than a second threshold and less than a third threshold.

12. A non-transitory computer-readable medium storing computer-executable instructions, that when executed by a processor, cause the processor to perform operations of:

receiving first tire pressure data for a first tire of a vehicle at a first time;

receiving second tire pressure data for the first tire at a second time;

adjusting the first tire pressure data based on one or more external factors, the one or more external factors including at least one of: an altitude or a temperature;

receiving third tire pressure data and fourth tire pressure data for the first tire;

determining that a first difference between the third tire pressure data and the fourth tire pressure data is greater than a first threshold amount;

receiving, subsequent to receiving the third tire pressure data, fifth tire pressure data for the first tire;

determining a second difference between the fourth tire pressure data and the fifth tire pressure data;

determining, based on the first difference and the second difference, that a rate at which air is leaving the first tire is a non-linear rate;

determining, based on determining that the rate at which air is leaving the first tire is a non-linear rate, that the fifth tire pressure data indicates that an intentional change in tire pressure is occurring;

filtering out the fifth tire pressure data based on the determination that the fifth tire pressure data indicates that an intentional change in tire pressure is occurring such that the fifth tire pressure data is disregarded in determining whether a slow leak is occurring in the first tire;

identifying a slow leak in the first tire based on a relationship between the first tire pressure data and the second tire pressure data and without considering the fifth tire pressure data; and causing to send an alert to a user indicating the slow leak.

13. The non-transitory computer-readable medium of claim 12, wherein the computer-executable instructions further cause the processor to perform operations of:

receiving third tire pressure data for a second tire of the vehicle; and receiving fourth tire pressure data for the second tire, wherein identifying the slow leak in the first tire is further based on a determination that a difference between the first tire pressure data and the second tire pressure data is greater than a difference between the third tire pressure data and the fourth tire pressure data.

14. The non-transitory computer-readable medium of claim 12, wherein identifying the slow leak in the first tire is further based on historical tire pressure data associated with the vehicle.

15. The non-transitory computer-readable medium of claim 12, wherein the computer-executable instructions further cause the processor to perform operations of:

receiving fifth tire pressure data for the first tire;

receiving sixth tire pressure data for the first tire;

determining that a difference between the fifth tire pressure data and the sixth tire pressure data is greater than a first threshold amount;

receive, subsequent to receiving the sixth tire pressure data, seventh tire pressure data for the first tire;

determine a difference between the sixth tire pressure data and the seventh tire pressure data;

determine, based on the difference between the fifth tire pressure data and the sixth tire pressure data and the difference between the sixth tire pressure data and the seventh tire pressure data, that the fifth tire pressure data and the sixth tire pressure data represent a non-linear relationship;

determine, based on determining that the fifth tire pressure data and the sixth tire pressure data represent a non-linear relationship, that the difference between the fifth tire pressure data and the sixth tire pressure data is an intentional change in tire pressure; and filtering out the sixth tire pressure data based on the determination that the difference between the fifth tire pressure data and the sixth tire pressure data is an intentional change in tire pressure.

16. The system of claim 1, wherein adjusting the first tire pressure data is also based on temperature data.

\* \* \* \* \*